US005720468A

United States Patent [19]

Morinigo

[11] Patent Number: 5,720,468
[45] Date of Patent: *Feb. 24, 1998

[54] STAGGERED ELECTROMAGNETICALLY ACTUATED VALVE DESIGN

[75] Inventor: Fernando B. Morinigo, Los Angeles, Calif.

[73] Assignee: Aura Systems, Inc., El Segundo, Calif.

[ * ] Notice: The term of this patent shall not extend beyond the expiration date of Pat. No. 5,548,263.

[21] Appl. No.: 729,851

[22] Filed: Oct. 15, 1996

Related U.S. Application Data

[60] Division of Ser. No. 236,383, Apr. 28, 1994, abandoned, which is a continuation-in-part of Ser. No. 084,737, Jun. 28, 1993, Pat. No. 5,548,263, which is a continuation-in-part of Ser. No. 957,194, Oct. 5, 1992, Pat. No. 5,222,714.

[51] Int. Cl.[6] ................................ F16K 31/02; F01L 9/04

[52] U.S. Cl. ................................ 251/129.1; 251/129.18; 123/90.11

[58] Field of Search ............................ 251/129.09, 129.1, 251/129.18; 123/90.11, 90.19

[56] References Cited

U.S. PATENT DOCUMENTS

| | | | |
|---|---|---|---|
| 4,515,343 | 5/1985 | Pischinger et al. | 123/90.11 X |
| 4,719,882 | 1/1988 | Kreuter | 123/90.11 |
| 4,777,915 | 10/1988 | Bonvallet | 123/90.11 |
| 4,783,009 | 11/1988 | Coates | 251/129.18 X |
| 5,131,624 | 7/1992 | Kreuter et al. | 251/129.18 |
| 5,350,153 | 9/1994 | Morinigo et al. | 251/129.1 X |
| 5,548,263 | 8/1996 | Bulgatz et al. | 251/129.18 X |

*Primary Examiner*—John Rivell
*Attorney, Agent, or Firm*—Kathy Mojibi Kavcioglu

[57] ABSTRACT

A compact staggered electromagnetically actuated valve assembly is disclosed. The assembly includes a first electromagnetic actuator defining an upper horizontal surface and an outer circumference and a second electromagnetic actuator defining a vertical axis and a lower horizontal surface. The second actuator lower horizontal surface is located vertically above the first actuator upper horizontal surface and the second actuator vertical axis is disposed outside of the first actuator outer circumference. An electromagnetically actuator for a valve having a valve stem exhibiting thermal expansion is further disclosed. The actuated valve includes an electromagnet and an armature element, the armature element having a normally biased spaced apart first position distal from the electromagnet when the electromagnet is off and a second position proximal from the electromagnet when the electromagnet is on. The valve includes seating springs that carry the electromagnet. The seating springs have a degree of thermal expansion substantially equal to the degree of thermal expansion of the valve stem. The valve may further include an armature element adjustment member that interacts with the armature element such that adjustment of the armature element adjustment member causes an axial displacement of the first position.

8 Claims, 4 Drawing Sheets

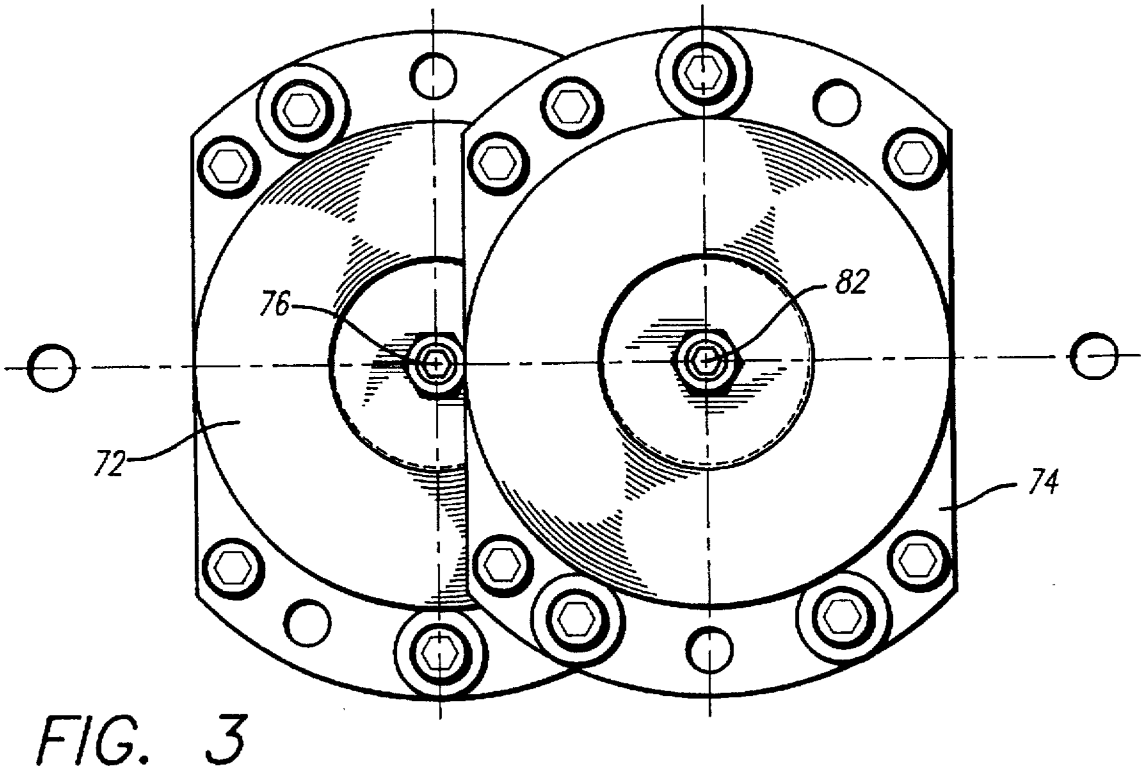
FIG. 3
FIG. 4
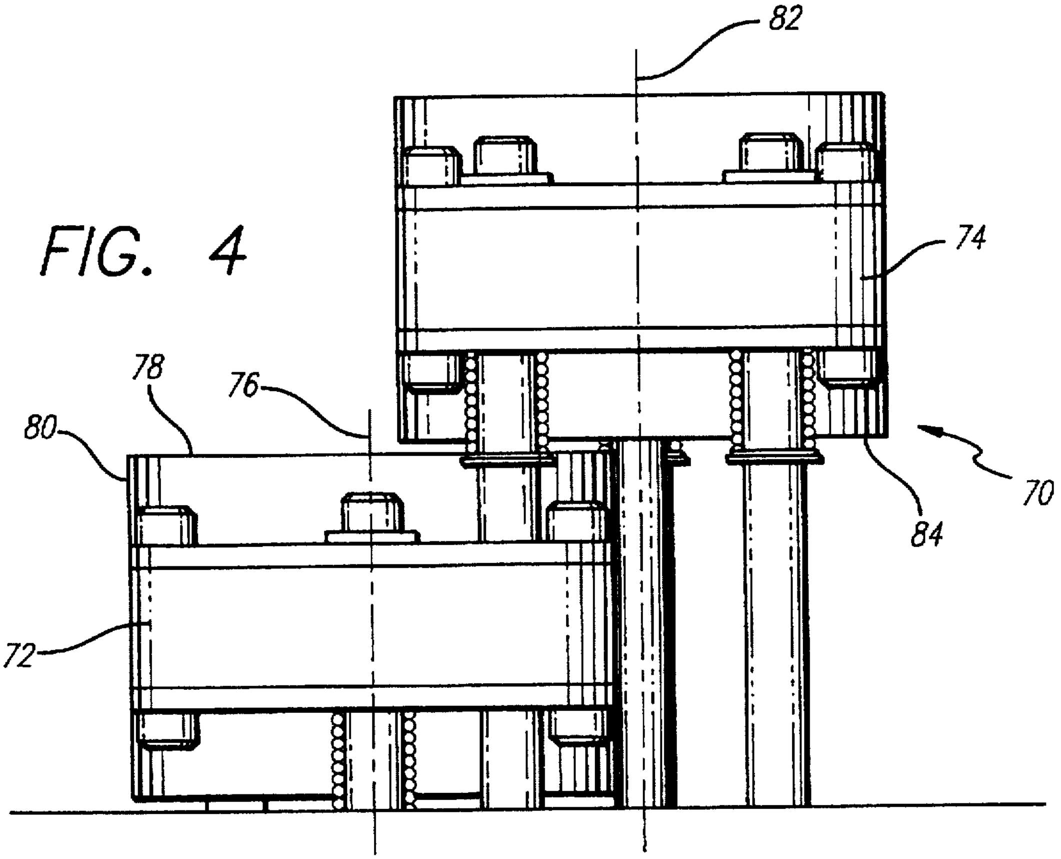

STAGGERED ELECTROMAGNETICALLY ACTUATED VALVE DESIGN

RELATED APPLICATION

The present application is a divisional application of application Ser. No. 08/236,383,filed Apr. 28, 1994, now abandoned, which application is a continuation-in-part of application Ser. No. 08/084,737, filed Jun. 28, 1993, now U.S. Pat. No. 5,548,263, which application is a continuation-in-part of application Ser. No. 07/957,194, filed Oct. 5, 1992, now U.S. Pat. No. 5,222,714.

FIELD OF THE INVENTION

The present invention relates generally to electromagnetically actuated valves, and more particularly to a compact electromagnetically actuated valve assembly having valves that allow for precise control of valve seating pressure.

BACKGROUND OF THE INVENTION

In the past, valves have been designed for opening and closing mechanisms that combine the action of springs with electromagnets. For example, in U.S. Pat. No. 4,614,170 issued to Pischinger, it is disclosed to use springs in an electromagnetically actuated valve to switch from an open to closed position and vice versa. In these valves, the armature lies at a center equilibrium position between two electromagnets To close the valve, a first electromagnet is energized, attracting the armature to the first electromagnet and compressing a spring. To open the valve the energized first electromagnet is turned off and the second electromagnet is energized. Due to the force of the pre-stressed spring, the armature is accelerated toward the second electromagnet, thereby reducing the amount of magnetic force required to attract the armature away from the first electromagnet.

One problem with the earlier valve designs was that the valves did not operate quickly enough to open and close the valves with sufficient speed, force or stroke required for the opening and closing of an internal combustion engine's intake and exhaust valves, or for the force and stroke required for gas compressors. Therefore, a need existed for a valve design that provided an efficiently designed moving armature assembly that could be accelerated quickly enough for the desired applications, such as the modern internal combustion engines.

A problem, however, with the use of electromagnetically actuated valves with modern internal combustion engines is that the design of engines only allows a specific area for the intake and exhaust valves. Because of the annular shape of the electromagnets and armature in the electromagnetically actuated valve, it is difficult to replace the hydraulic valves with electromagnetically actuated valves without requiring substantial modifications to the engine design. This problem is more extreme when an engine requires four valves per cylinder. Therefore, a need exists for an electromagnetically actuated valve assembly design that is compatible with a modern automobile internal combustible engine, with minimal modifications to the engine design.

A problem encountered with the design of electromagnetically actuated valves is in obtaining the precise mechanical tolerances required to achieve a zero gap at the upper electromagnet when the valve is properly seated. This problem is exacerbated by the thermal expansion that occurs during operation of the valve. Under test conditions, the valve stem of an electromagnetic actuator has lengthened up to 12 thousandths of an inch due to heat expansion. When the valve closes, the pole face contacts the upper electromagnet, but due to the increased length in the valve stem, the valve may not be seated properly. Alternatively, the valve may be seated before the armature element reaches the upper electromagnet, preventing the valve from obtaining a zero gap. A zero gap is desired to maintain power consumption at a low level, and therefore, the valve is not operating at a desired efficiency level.

Another problem with the previously designed valves is that the moving armature assembly must return to an initial neutral position when not in operation. The initial neutral position of the armature element must be equidistant from both the first electromagnet and the second electromagnet. As previously described, it is known to use a spring to bias the armature assembly in this neutral position. However, spring tensions inevitably vary, which creates difficulty in obtaining a neutral position for the armature element that is centered between the electromagnets. Therefore, it is desirable to have an means for manually adjusting the position of the armature element in order to achieve the centered neutral position.

Another problem with the previously designed valves was that they lack a mechanism for the control of the force which the closed valve exerts on the valve seat. The force of the valve on the seat must in practice remain within certain tolerances for valve and seat durability.

Another problem with the previous valve designs is that they lack a mechanism for adjustment of the speed with which the valve approaches the seat.

SUMMARY OF THE INVENTION

Accordingly, it is a primary object of the present invention to overcome one or more disadvantages and limitations of the prior art.

A significant object of the present invention is to provide an electromagnetically actuated valve assembly design that allows several actuated valves to fit within a compact space.

Another object of the present invention is to provide an electromagnetic actuator that compensates for heat expansion during operation of the actuator.

Another object of the present invention is to provide electromagnetic actuator with manual adjustment for obtaining precise mechanical tolerances.

According to a broad aspect of the present invention, an electromagnetically actuator for a valve having a valve stem exhibiting thermal expansion includes an electromagnet and an armature element, the armature element having a normally biased spaced apart first position distal from the electromagnet when the electromagnet is off and a second position proximal from the electromagnet when the electromagnet is on. The valve includes seating springs that carry the electromagnet. The seating springs have a degree of thermal expansion substantially equal to the degree of thermal expansion of the valve stem. The valve may further include an armature element adjustment member that interacts with the armature element such that adjustment of the armature element adjustment member causes an axial displacement of the first position.

According to another aspect of the present invention, a compact staggered electromagnetically actuated valve assembly includes a first electromagnetic actuator defining an upper horizontal surface and an outer circumference and a second electromagnetic actuator defining a vertical axis and a lower horizontal surface. The second actuator lower horizontal surface is located vertically above the first actuator upper horizontal surface and the second actuator vertical axis is disposed outside of the first actuator outer circumference.

A feature of the present invention is that the combination of the first and second resilient members provides compensation for heat expansion of the moving assembly in the actuator.

Another feature of the present invention is that the adjustment device allows the neutral position of the armature assembly to be set precisely.

Another feature of the present invention is that the design of the moving armature assembly allows quick acceleration of the actuator.

Another feature of the present invention is a refinement of the magnetic circuit, namely the surrounding of the armature by magnetic material. This refinement tends to provide a larger force when the armature is at larger distances from the electromagnet, and smaller forces when the armature is nearer the electromagnet. This allows operation with use of less energy.

Another feature of the present invention is that the force of the closed valve on its seat can be guaranteed to lie within narrow limits.

Another feature of the present invention is that straight forward adjustments can be made to increase or to lower the speed at which the closing valve reaches its seated position.

These and other objects, advantages and features of the present invention will become readily apparent to those skilled in the art from a study of the following description of an exemplary preferred embodiment when read in conjunction with the attached drawing and appended claims.

BRIEF DESCRIPTION OF THE DRAWINGS

FIG. 3 is a top view of one embodiment of the staggered electromagnetic actuator design of the present invention;

FIG. 4 is front view of the staggered electromagnetic actuator design of FIG. 3.

DESCRIPTION OF AN EXEMPLARY PREFERRED EMBODIMENT

Figure 1:
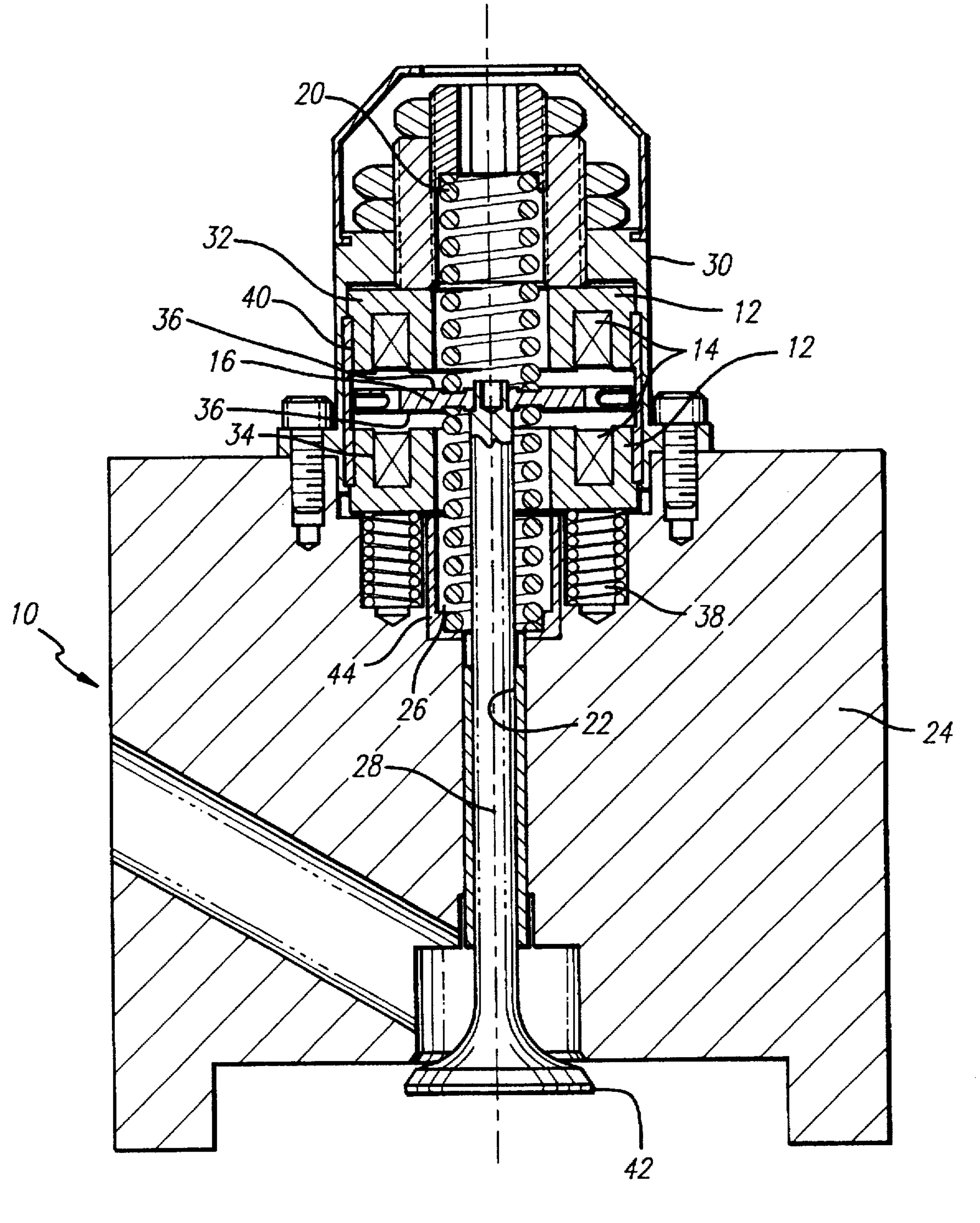
FIG. 1 is a cross-sectional view of one embodiment of electromagnetically actuated valve of the present invention providing precise control of valve seating pressure.

Referring now to FIG. 1, one embodiment of an electromagnetically actuated Valve 10 of the present invention is shown in cross-section. In the embodiment shown, the valve 10 includes two pairs of electromagnetic elements 12, a plurality of coils 14, a core or armature element 16, a support spring 20, a valve stem 22, and a valve case 24. Each of the electromagnetic elements 12 are preferably annular-shaped, and define a central chamber 26. The central chamber 26 further defines a central vertical axis 28.

In the embodiment shown in FIG. 1, each pair of electromagnetic elements 12 further comprises an upper electromagnetic element 32 and a lower electromagnetic element 34. The upper and lower electromagnetic elements each include a central channel 30, in which the coils 14 are disposed. The upper and lower electromagnets 32, 34 are in a mirrored relationship to each other, with the central channels 30 of the upper and lower electromagnetic elements being in a facing relationship to each other.

Disposed intermediate the upper and lower electromagnetic elements 32, 34 is the armature element 16. The armature element has a normally biased spaced apart first position distal from one of the electromagnets 32, 34 when that electromagnet is off and a second position proximal from that electromagnet when that electromagnet is on. The armature element 16 is preferably annular-shaped in horizontal cross-section. The armature element 16 provides two pole faces 36.

The armature element 16 is interconnected to the valve stem 22. The valve stem 22 preferably extends in axial alignment with the central vertical axis 28 of the central chamber 26 of the electromagnetic elements 12. A valve case 24 encloses the valve.

The lower and upper electromagnets 32, 34 are connected by a spacer 40. The spacer 40 maintains a constant distance between the upper and lower electromagnets 32, 34. Therefore the upper and lower electromagnets act as an assembly. The spacer is preferably fabricated from a magnetic steel material.

The seating springs 38 and support spring 20 are used to compensate for heat expansion in the valve stem. More specifically, when the valve head 42 is properly seated, the armature element 16 should be in contact with the upper electromagnet 32. If the valve stem expands, the armature element will contact the upper electromagnet 32 before the valve head 42 is properly seated. However, if the valve stem is shortened to accommodate for heat expansion, the valve head may seat before the armature 16 contacts the upper electromagnet.

The support spring 20 is disposed within the central chamber 26, preferably surrounding the valve stem 22. In the embodiment shown, the lower end of the support spring contacts a support spring base member 44. The base member 44 is threadingly engaged with the lower electromagnet 34. Therefore, the base member 44 may be adjusted so as to either compress or expand the support spring, thereby changing the axial position of the armature.

The valve also includes two seating springs 38. In the embodiment shown, the seating springs contact a portion of the valve case 24 and the lower electromagnet 34, such that the lower electromagnet is carried by the seating springs 38. The seating springs have a degree of thermal expansion substantially equal to the degree of thermal expansion of the valve stem. Therefore, if the valve stem expands due to heat and the armature element 16 is axially displaces, the electromagnet also expands causing the electromagnets to axially displace to the same degree as the armature element. Therefore the seating springs 38 function as an electromagnet displacement element and alleviate the problems created by the heat expansion of the valve stem.

The combination and interaction of the support spring 20 and the seating springs 38 also serve to eliminate the problems caused by heat expansion. As previously discussed, the support spring is used to bias the armature element in the normally biased first position. The support spring is a resilient member, and has a known value of resiliency. The seating springs serve to bias the upper electromagnet away from the armature. The seating springs are resilient members, and also have a known value of resiliency. The support spring 20 and seating springs 38 are selected such that the resiliency of the support spring 20 is greater than the resiliency of the seating springs 38.

Therefore, when the electromagnet is on, the armature 16 moves upward toward the upper electromagnet 32 until the valve head is seated. At this point, the upper electromagnet is attracted downward to the armature element 16, until a zero gap exists between the armature 16 and the upper electromagnet 32.

Figure 2:
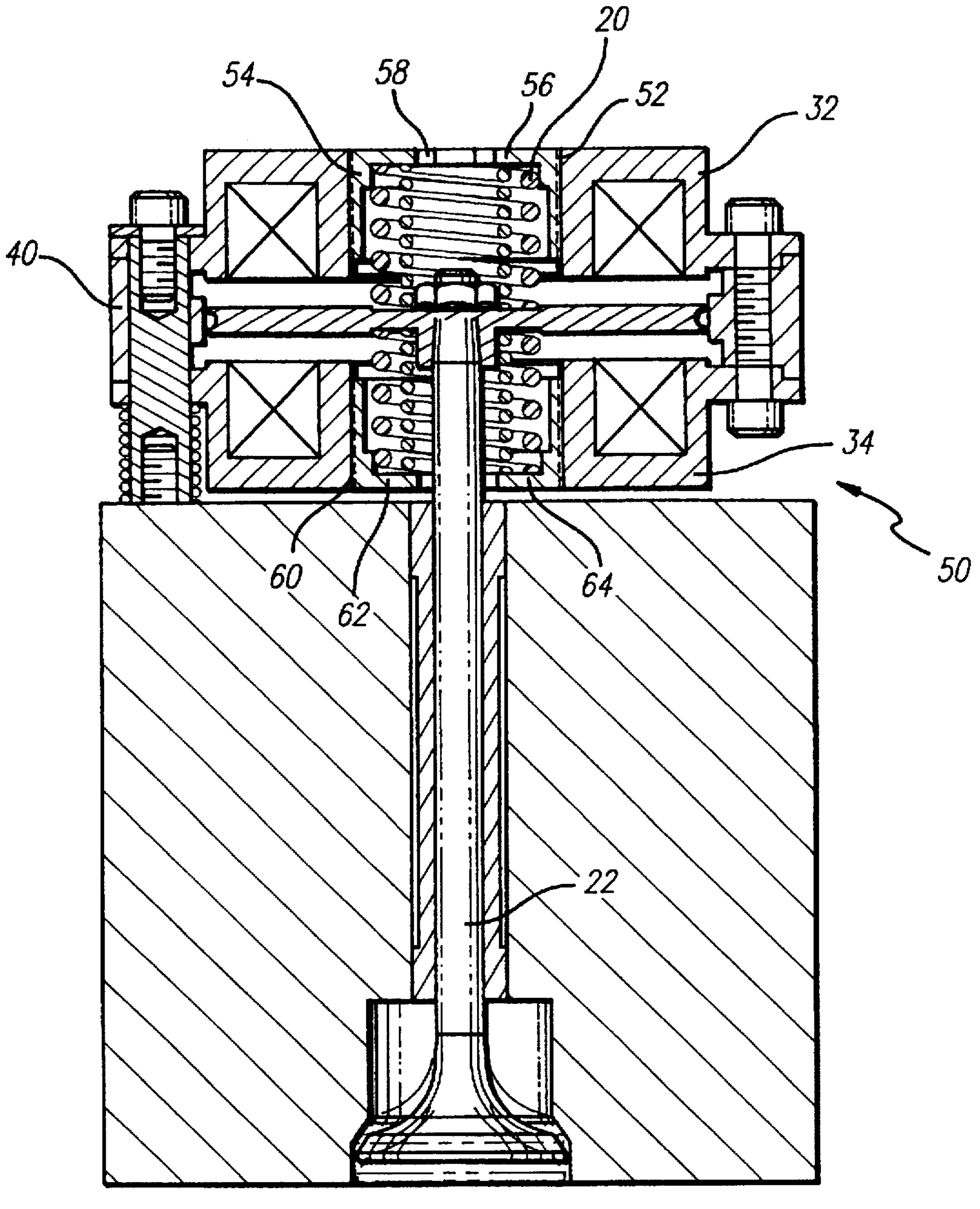
FIG. 2 is a cross-sectional view of another embodiment of the electromagnetically actuated valve of the present invention.

Referring now to FIG. 2, an alternative embodiment 50 of the electromagnetically actuated valve of the present invention is described. This embodiment includes an upper support spring adjustment member 52. The support spring adjustment member 52 is shown in FIG. 2 as comprising a hollow screw member 54. The hollow screw member 54 is threadingly engaged into the upper electromagnet 32. The hollow screw member 54 includes a cap 56. The cap 56 defines a hexagonal aperture 58. In the embodiment shown, the hollow screw member 54 engages the upper end of the support spring 20. The support spring 20 engages the armature element 16. Therefore, when the hollow screw member 54 is rotated, the support spring compresses, moving the armature element in a downward axial position. When the screw member 68 is loosened, the support spring expands, allowing the armature element to move in an upward axial position. The hexagonal aperture 58 is used to facilitate the tightening and loosening of the hollow screw member 54.

The embodiment 50 further includes a lower support spring adjustment member 60. The lower support spring adjustment member is comprised of a second hollow screw member 62 that is threadingly engaged with the lower electromagnet 34. The second hollow screw member 62 includes a second cap 64. When the second hollow screw member 62 is rotated, the support spring compresses, moving the armature element in an upward axial position. When the second hollow screw member 62 is loosened, the support spring expands, allowing the armature element to move in a downward axial position.

The function of the support spring adjustment member 52 is to provide precise positioning of the armature element 16 between the upper and lower electromagnets 32, 34. As previously described, the armature element should be precisely centered between the electromagnets. The support spring adjustment member 52 allows the manual positioning of the armature element after the valve is assembled. It is to be noted that the support spring adjustment member 52 may contact the support spring in another area and still provide the same armature positioning feature.

In the embodiment 50 of the actuator shown in FIG. 2, the upper and lower electromagnets are interconnected with a spacer 40. The spacer 40 is preferably fabricated from a magnetic steel material. The use of magnetic steel allows the magnetic circuit to provide larger forces at large gaps and lower force at small gaps.

The embodiment shown in FIG. 2 includes three seating springs 38. The number of seating springs, however, may vary depending on the application of the actuator.

Figure 5:
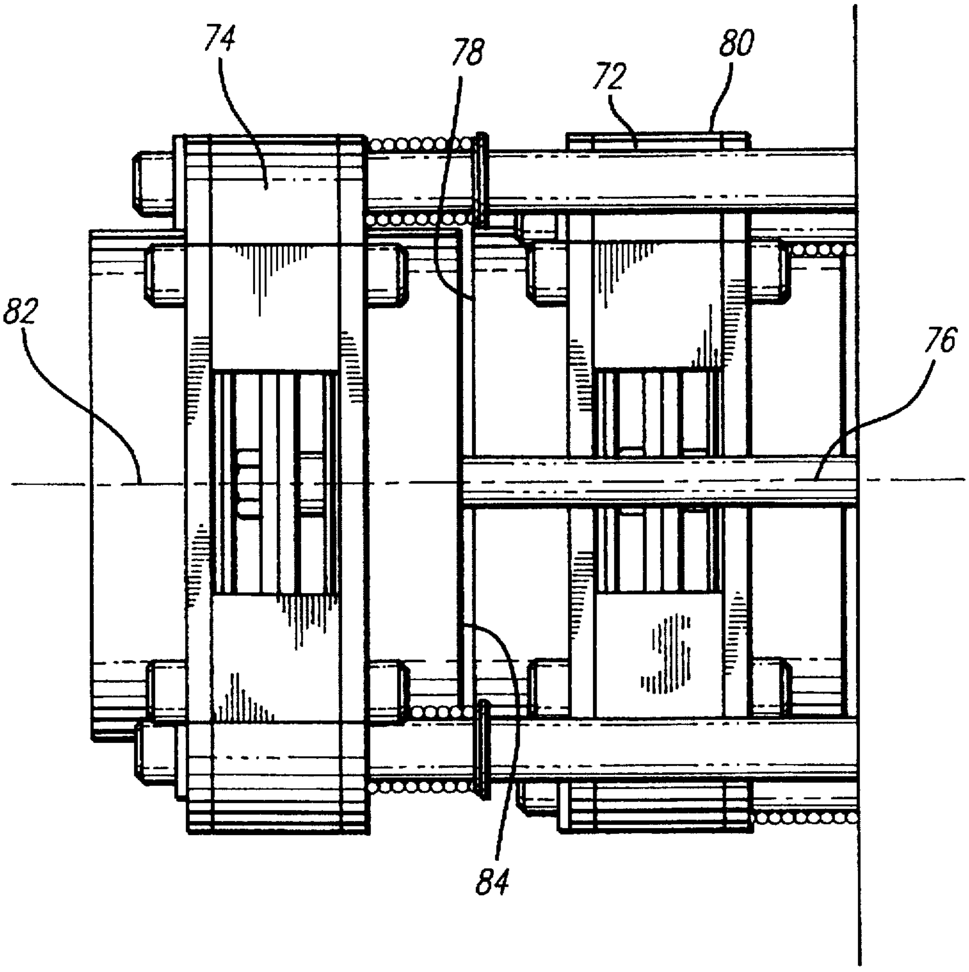
FIG. 5 is side view of the staggered electromagnetic actuator design of FIG. 3.

Referring now to FIGS. 3, 4, and 5, the compact electromagnetically actuated valve assembly 70 is described. For purposes of reference, the assembly is described as having two actuated valves. However, any number of valves may be utilized in the assembly.

As shown in FIGS. 3 and 4, the valve assembly 70 includes a first electromagnetically actuated valve 72 and a second electromagnetically actuated valve 74. The first electromagnetically actuated valve 72 defines a first central vertical axis 76, an upper horizontal surface 78, and an outer circumference 80. The second electromagnetically actuated valve 74 defines a second vertical axis 82 and a lower horizontal surface 84. In the embodiment shown, the central vertical axes 76, 82 align with the stem of each of the corresponding valves.

As best shown in FIGS. 3 and 4, the central vertical axis 82 of the second actuator 74 is disposed outside of the outer circumference 80 of first actuator 72. As best shown in FIG. 4, the lower horizontal surface 84 of the second actuator 74 is disposed above the upper horizontal surface 78 of the first actuator 72. FIG. 5 shows the first and second actuator as being aligned from the side view, with the first and second vertical axes 76,82 being parallel to each other. The actuators, however, may be offset to accommodate for different applications of the valve assembly.

In another embodiment of the electromagnetically actuated valve assembly, the first actuator central vertical axis 76 and the second actuator central vertical axis 82 do not extend parallel to each other. However, the second actuator central vertical axis 82 is disposed outside of the first actuator outer circumference 80, and the second actuator lower horizontal surface 84 is disposed above the first actuator upper horizontal surface 78. This embodiment allows the compact valve assembly to be utilized in connection with non-planar surfaces, such as the non-planar surfaces of several known automobile engine heads.

The above-described compact, staggered valve assembly allows several electromagnetically actuated valves to fit into a relatively compact space. By way of example, the staggered valve assembly 70 allows the substitution of electromagnetically actuated valves of the present invention for the intake and exhaust valves of the modern automobile engines with minimal modifications to the existing engine design.

There has been described hereinabove an exemplary preferred embodiment of the electromagnetically actuated valve according to the principles of the present invention. Those skilled in the art may now make numerous uses of, and departures from, the above-described embodiments without departing from the inventive concepts disclosed herein. Accordingly, the present invention is to be defined solely by the scope of the following claims.

I claim as my invention:

1. An electromagnetic actuator for an actuated valve having a valve stem exhibiting a known degree of thermal expansion, said actuator comprising:

a first electromagnet;

a first armature element interconnected with the valve stem and having a normally biased initial spaced apart first position distal from said electromagnet when said electromagnet is off and a second position proximal from said electromagnet when said electromagnet is on; and an electromagnet displacement element for axially displacing said electromagnet a distance commensurate with the degree of thermal expansion of the valve stem.

2. An electromagnetic actuator for an actuated valve in accordance with claim 1 further comprising a second electromagnet, said second electromagnet being in a mirrored relationship to said first electromagnet.

3. An electromagnetic actuator for an actuated valve in accordance with claim 2 further comprising a spacer connecting said first and second electromagnets, such that said electromagnets move as an assembly.

4. An electromagnetic actuator for an actuated valve in accordance with claim 3 wherein said spacer is fabricated from a magnetic material.

5. An electromagnetic actuator for an actuated valve having a valve stem exhibiting a known degree of thermal expansion, said actuator comprising:

a first electromagnet;

a first armature element interconnected with the valve stem and having a normally biased initial spaced apart first position distal from said electromagnet when said electromagnet is off and a second position proximal from said electromagnet when said electromagnet is on; and an electromagnet displacement element for axially displacing said electromagnet a distance commensurate with the degree of thermal expansion of the valve stem wherein said electromagnet displacement element comprises a seating spring, wherein said electromagnet is carried by said seating spring and further wherein said seating spring has a spring degree of thermal expansion equal to the valve stem known degree of thermal expansion.

6. An electromagnetic actuator for an actuated valve in accordance with claim 5 wherein three seating springs are used.

7. An electromagnetic actuator for an actuated valve, the valve having a closed position and having a valve stem exhibiting a known degree of thermal expansion, comprising:

a first electromagnet;

an armature element adapted to be mounted to the valve stem, said armature element having a normally biased spaced apart first position distal from said electromagnet when said electromagnet is off and a second position proximal from said electromagnet when said electromagnet is on;

an armature element adjustment member, said adjustment member interconnected with said armature element such that adjustment of said armature element causes an axial displacement of the armature first position; and an electromagnet displacement element for axially displacing said electromagnet at a distance commensurate with the degree of thermal expansion of the valve stem.

8. An electromagnetic actuator for an actuated valve, the valve having a closed position and having a valve stem exhibiting a known degree of thermal expansion, comprising:

a first electromagnet;

an armature element adapted to be mounted to the valve stem, said armature element having a normally biased spaced apart first position distal from said electromagnet when said electromagnet is off and a second position proximal from said electromagnet when said electromagnet is on;

an armature element adjustment member, said adjustment member interconnected with said armature element such that adjustment of said armature element causes an axial displacement of the armature first position; and an electromagnet displacement element for axially displacing said electromagnet at a distance commensurate with the degree of thermal expansion of the valve stem, wherein said electromagnet displacement element comprises at least one seating spring, said electromagnet being carried by said seating spring, and said seating spring further having a spring degree of thermal expansion substantially equal to the valve stem known degree of thermal expansion.

* * * * *